Jan. 19, 1926.   1,570,369
H. L. BLOOD ET AL
CONTROL SYSTEM
Filed August 25, 1923

INVENTORS
H. L. Blood and
R. C. Deale.
BY
Wayne B. Wells
ATTORNEY

Patented Jan. 19, 1926.

1,570,369

UNITED STATES PATENT OFFICE.

HAROLD L. BLOOD, OF NORTH PLAINFIELD, AND ROBERT C. DEALE, OF PLAINFIELD, NEW JERSEY, ASSIGNORS TO NILES-BEMENT-POND COMPANY, OF NEW YORK, N. Y., A CORPORATION OF NEW JERSEY.

CONTROL SYSTEM.

Application filed August 25, 1923. Serial No. 659,364.

*To all whom it may concern:*

Be it known that we, HAROLD L. BLOOD and ROBERT C. DEALE, citizens of the United States, and residents, respectively, of North Plainfield, in the county of Somerset and State of New Jersey, and Plainfield, in the county of Union and State of New Jersey, have invented certain new and useful Improvements in Control Systems, of which the following is a specification.

Our invention relates to control systems and particularly to control systems for governing the operation of machine tools.

One object of our invention is to provide a control system that shall automatically control a feed motor and reverse the direction of rotation of such motor at each end of the stroke of a reciprocating member and that shall control the feed motor at will while insuring against automatic operation thereof.

Another object of our invention is to provide a control system that shall have a reciprocating member for automatically controlling the operation of a main motor and a feed motor and that shall be provided with a portable switch mechanism for preventing automatic operation of the main motor and the feed motor and for effecting operation of the motors at will.

Another object of our invention is to provide a control system of the above indicated character that shall be provided with switches for accelerating the main motor in a forward and in a reverse direction and for completing a dynamic braking circuit therethrough and with switches for accelerating the feed motor in a forward and in a reverse direction and for completing a dynamic braking circuit therethrough and that shall be provided with a portable switch mechanism for controlling the main motor switches and the feed motor switches at will.

A further object of our invention is to provide a control system of the above indicated character that shall be provided with a portable switch mechanism having two switch members for respectively controlling the main and the feed motor at will and that shall be provided with interlock switches associated with the portable switch mechanism for preventing the automatic operation or acceleration of the main motor and the automatic operation of the feed motor when one of the switch members on the portable switch mechanism is moved from initial position.

In a control system constructed in accordance with our invention, two main switches are provided for operating the main motor in a forward and in a reverse direction and for completing a dynamic braking circuit therethrough. Two accelerating switches are provided for governing the acceleration of the main motor in accordance with the counter electromotive force. Two feed switches are provided for operating the feed motor in a forward and in a reverse direction and for completing a dynamic braking circuit therethrough. An accelerating switch is provided for governing the acceleration of the feed motor. The main and the feed motors are automatically controlled in accordance with the movement of a reciprocating member as for example the reciprocating table of a planer. The feed motor and the main motor are not only controlled automatically by a pilot switch but are controlled at will by means of a portable switch mechanism having two switch members. One of the switch members serves to control the feed motor and the other switch serves to control the main motor. Each of the switch members is provided with interlock switches to prevent the automatic operation of either of the motors and to prevent the acceleration of the main motor when one of the switch members is moved from initial position. In the application of Robert C. Deale, Serial No. 659,339 filed August 25, 1923, is claimed the specific type of pendent switch mechanism disclosed in this application.

Figure 1:
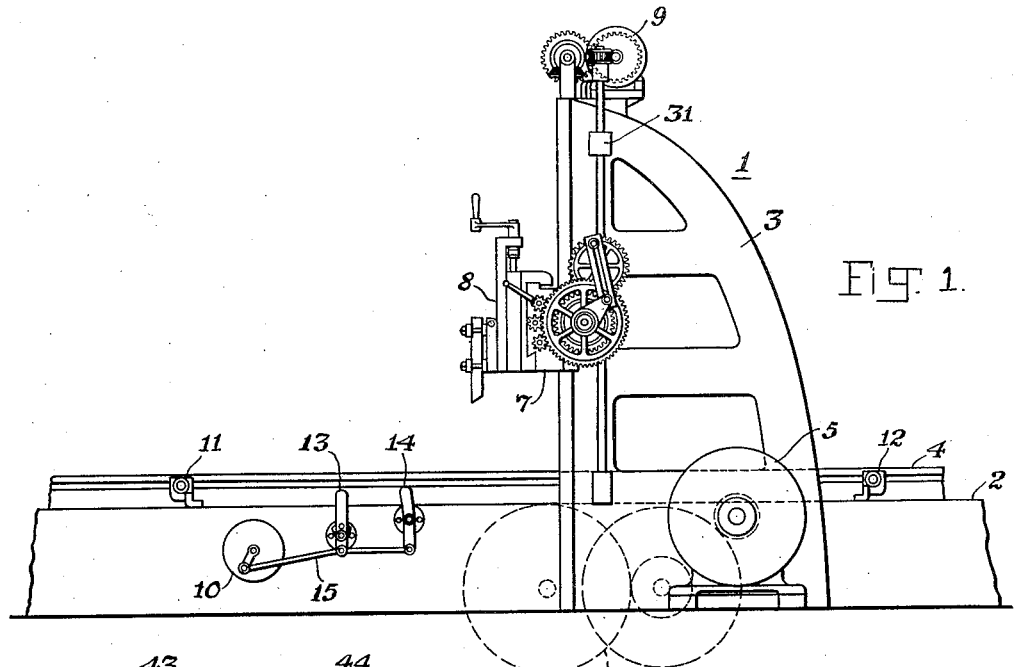
Figure 1 is a front elevational view of a planer adapted to be operated in accordance with our invention.

Referring to Fig. 1 of the drawing, a planer 1 is shown comprising a bed 2 and uprights 3. A table 4, which is mounted on the bed 2, is operated by a main motor 5. The main motor 5 is connected to the table 4 by means of any suitable gearing 6. A cross rail 7, which is mounted on the uprights 3, carries a tool head 8. A feed motor 9 is mounted on the arch which is connected to the two uprights 3. The feed motor 9 not only serves to effect feeding and traversing movements of the tool head 8 but also serves to vary the position of the cross rail 7 on the uprights 3.

The main motor 5 and the feed motor 9 are automatically controlled by a pilot switch 10 which is suitably mounted on the bed 2 of the machine. The pilot switch 10 is operated by two dogs 11 and 12 which are mounted on the table 4 of the machine. Near the end of the forward or cutting stroke, the dog 11 engages a lever 13 for operating the pilot switch in one direction and near the end of the return stroke, the dog 12 engages a lever 14 for reversing the position of the pilot switch. The two levers 13 and 14 are connected to the pilot switch by means of links 15. The dogs 11 and 12 may be adjusted along the table 4 to vary the stroke of the planer.

Figure 2:
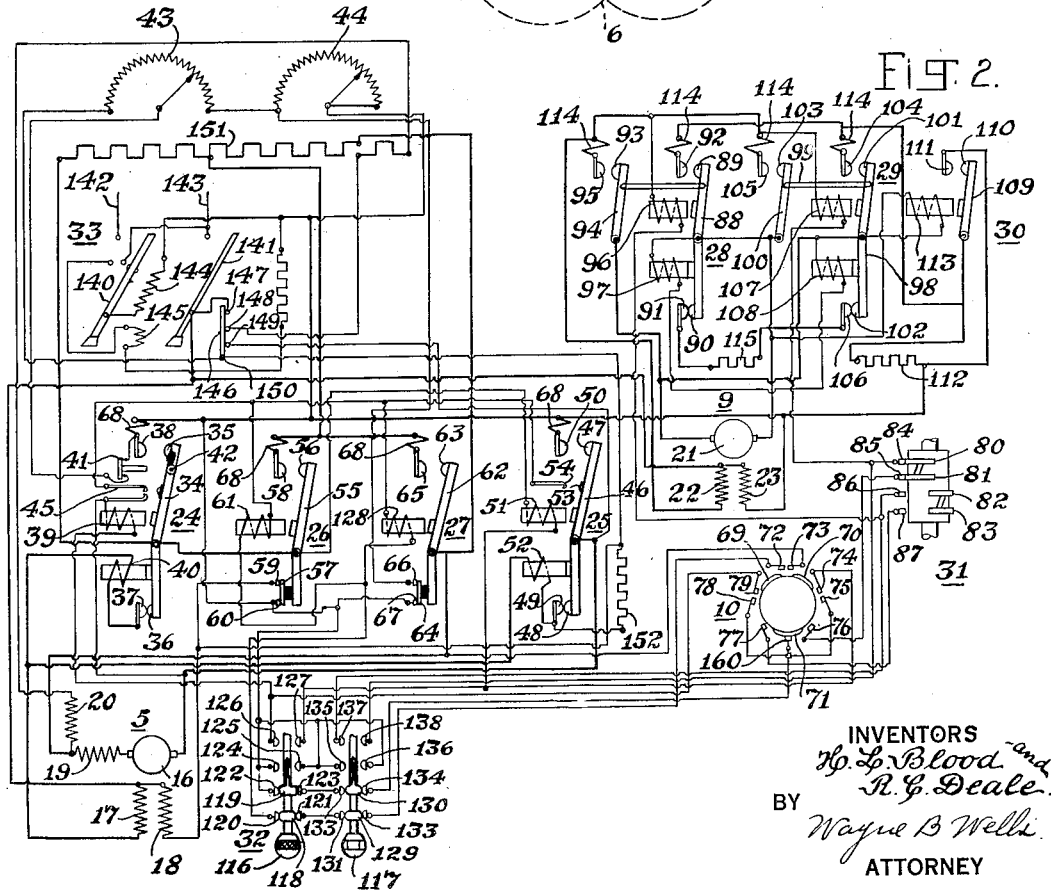
Fig. 2 is a diagrammatic view of a control system embodying our invention.

Referring to Fig. 2 of the drawing, the main motor 5 is shown comprising an armature 16, a series field-magnet winding 17, a shunt field-magnet winding 18, a commutator winding 19, and an emergency winding 20. The feed motor comprises an armature 21, a series field-magnet winding 22, and a shunt field-magnet winding 23. The main motor 5 is controlled by two main switches 24 and 25 and two accelerating switches 26 and 27. The feed motor is controlled by two feed switches 28 and 29 and an accelerating switch 30.

A limit switch 31 is provided for limiting the feeding movements and a portable switch mechanism 32 is provided for operating the main and the feed motor at will. A suitable circuit breaker 33 is provided for opening the circuits of the motors upon over-load or under-load circuit conditions.

The main switch 24 comprises a pivotally mounted switch arm 34 which carries two contact members 35 and 36. The contact member 36 engages a stationary contact member 37 in the released position of the switch arm and the contact member 35 engages a stationary contact member 38 in the operative position of the switch arm. A main magnet 39 is provided for operating the switch arm 34. A holding magnet 40 is provided for preventing operation of the switch arm 34 when the main switch 25 is operated and also for preventing operation of the switch arm 34 when a dynamic braking current is flowing through the main motor. A switch 41 is operated by a pin 42 on the switch arm 34 for inserting a resistor 43 in series with a resistor 44 and the shunt field-magnet winding 18 whenever the main switch 24 is operated to effect a return movement of the planer table. Insertion of the resistors 43 and 44 in circuit with the shunt field-magnet winding effects a return stroke at a relatively rapid rate. A switch 45 is closed by the switch arm 34 for completing a circuit to operate the accelerating switches 26 and 27 under certain conditions.

The main switch 25 comprises a pivotally mounted switch arm 46 which carries two contact members 47 and 48. The contact member 48 engages a contact member 49 in the released position of the switch arm and the contact member 47 engages a contact member 50 in the operative position of the switch arm. A main magnet 51 is provided for operating the switch arm. A holding magnet 52 is provided for preventing operation of the switch arm 46 when the main switch 24 is in an operative position and when a dynamic braking current is flowing through the main motor. A contact member 53, which is carried by the switch arm, engages a stationary contact member 54 when the switch is in an operative position. The contact members 53 and 54 complete a circuit for operating the accelerating switches 26 and 27.

The accelerating switch 26 comprises a pivotally mounted switch arm 55 which carries a contact member 56 and an insulated contact member 57. The contact member 56 engages a stationary contact member 58 when the switch arm 55 is in an operative position. The insulated contact member 57 bridges contact members 59 and 60 when the switch arm is in a released position. A magnet 61 is provided for operating the accelerating switch in accordance with the counter electromotive force developed by the motor 5.

The accelerating switch 27 comprises a pivotally mounted switch arm 62 which carries a contact member 63 and an insulated contact member 64. The contact member 63 engages a stationary contact member 65 when the switch arm 62 is in an operative position. The insulated contact member 64 bridges contact members 66 and 67 when the switch arm is in a released position. A magnet 128 is provided for operating the switch arm 62. Suitable blow-out coils 68 are provided for extinguishing the arcs formed by the main switches 24 and 25 and the accelerating switches 26 and 27.

The pilot switch 10 comprises three contact segments 69, 70 and 71 which are adapted to engage contact members 72 to 79, inclusive, and a contact member 160. The limit switch 31 comprises electrically connected contact segments 80 to 83, inclusive, which are adapted to engage contact fingers 84 to 87, inclusive.

The feed switch 28 comprises a switch arm 88 which carries two contact members 89 and 90. In the released position of the switch arm, the contact member 90 engages a stationary contact member 91 and in the operative position of the switch arm, the contact member 89 engages a stationary contact member 92. A contact member 93, which is mounted on a switch arm 94, is operated in accordance with the operation of the switch arm 88 to engage a stationary contact member 95. A magnet 96 is provided for effecting operation of the switch arms 94 and 88 and a holding magnet 97 is provided for preventing operation of the switch arms when a dynamic braking current is flowing through the feed motor 9.

The feed switch 29 comprises a pivotally mounted switch arm 98 which is connected by a link 99 to a pivotally mounted switch arm 100. The switch arm 98 carries two contact members 101 and 102 and the switch arm 100 carries a contact member 103. The contact members 101 and 103 respectively engage stationary contact members 104 and 105 when the switch 29 is in the operative position. The contact member 102 engages a stationary contact member 106 when the switch 29 is in the released position. A magnet 107 is provided for operating the switch and a holding magnet 108 is provided for preventing operation of the switch when a dynamic braking current is flowing through the motor 9.

The accelerating switch 30 for the feed motor 9 comprises a pivotally mounted switch arm 109 which carries a contact member 110. The contact member 110 engages a stationary contact member 111 in the operative position of the switch to short circuit an accelerating resistor 112. A magnet 113 is provided for operating switch arm 109. Suitable blow-out coils 114 are provided for extinguishing the arcs formed by the contact members of the feed switches 28 and 29. A dynamic braking resistor 115 is provided for limiting the braking current flowing through the feed motor under braking conditions.

The portable or pendent switch mechanism 32 comprises two switch members 116 and 117 which respectively control the main motor 5 and the feed motor 9. The switch members 116 and 117 not only control the two motors at will but also prevent operation of the main and the feed motor by the pilot switch and prevent acceleration of the main motor by the accelerating switches under certain conditions. The switch member 116 comprises two contact segments 118 and 119 which are adapted to engage contact members 120 to 127, inclusive. In the position of the switch member 116 as shown, the contact segment 118 bridges the contact members 121 and 120 for completing a circuit through the magnets 61 and 128 of the accelerating switches 26 and 27. The contact segment 119 bridges the contact members 122 and 123 for completing a circuit to operate the main switches 24 and 25 and the feed switches 28 and 29 by means of the pilot switch 10.

The switch member 117 comprises two contact members 129 and 130 which are adapted to engage contact members 131 to 138, inclusive. The contact segment 129 bridges the contact members 131 and 132 for completing a circuit to operate the accelerating switches 26 and 27. The contact segment 130 bridges the contact members 133 and 134 to permit the automatic operation of the main switches 24 and 25 and the feed switches 28 and 29.

The circuit breaker 33 may be of any suitable type and, as shown, comprises two switch arms 140 and 141 which are adapted to be connected to the supply conductors 142 and 143. An over-load winding 144, and a low voltage winding 145 are provided for controlling the operation of the switch arms 140 and 141. A switch arm 146 is provided for bridging contact members 147, 148, 149 and 150 upon release of the circuit breaker. The switch arm 146 serves to complete an emergency braking circuit. An accelerating resistor 151 is provided for the main motor 5 and a choke resistor 152 is provided for the shunt field-magnet winding 18.

During the automatic operation of the system, the main motor 5 is controlled by the pilot switch 10 and the feed motor 9 is controlled by the pilot switch 10 and the limit switch 31. Near the end of the forward or cutting stroke of the planer, the dog 11 engages the lever 13 to operate the pilot switch 10. The contact segment 69 is moved to bridge the contact fingers 78 and 79. The contact segment 70 is moved to bridge the contact fingers 72 and 73 and the contact segment 71 is moved to bridge the contact fingers 76 and 160. Upon bridging the contact fingers 78 and 79 by the contact segment 69, a circuit is completed for energizing the magnet 39 of the main switch 24. The energizing circuit for the magnet 39 extends from the supply conductor 143 through the switch arm 141, series field-magnet winding 17, holding coil 52, contact members 48 and 49, switch arm 46, magnet 39, contact fingers 78 and 79, which are bridged by the contact segment 69, contact members 133 and 134, which are bridged by the contact segment 130, contact fingers 122 and 123, which are bridged by the contact segment 119, winding 144, and the switch arm 140 to the supply conductor 142.

The main switch 24 is operated and a circuit is completed through the main motor 5 for effecting a return stroke of the planer table. The circuit through the main motor extends from the supply conductor 143 through the switch arm 141, series field-magnet winding 17, holding coil 52, contact members 49 and 48, switch arm 46, armature 16, commutator winding 19, resistor 151, switch arm 34, contact members 35 and 38, over-load winding 144, and the switch arm 140 to the supply conductor 142.

Upon building up the counter electromotive force of the main motor, the accelerating switch 26 is operated to short-circuit a portion of the accelerating resistor 151. The circuit through magnet 61 of the accelerating switch 26 extends from one terminal of the armature 16 through the switch 45, which is closed by the switch arm 34, magnet 61, contact members 120 and 121, which are bridged by the contact segment 118, contact members 131 and 132, which are bridged by the contact segment 129, contact members 72 and 73, which are bridged by contact segment 70, and commutator winding 19 to the other terminal of the armature 16. The magnet 128 of the accelerating switch 27 is connected in parallel with the magnet 61 of the accelerating switch 26. After the operation of the accelerating switch 26, the accelerating switch 27 is operated for short-circuiting all of the resistor 151. In tracing the above circuits, it will be noted the energizing circuit for the main magnet 24 is interlocked through both of the switch members of the pendent switch mechanism. Moreover, the energizing circuit for each of the accelerating switches is interlocked through each of the switch members of the pendent switch mechanism.

Prior to the operation of the accelerating switch 26, the circuit for the shunt field-magnet winding extends from the supply conductor 143 through the switch arm 141, winding 18, contact members 59 and 60, which are bridged by the contact segment 57, winding 144, and the switch arm 140 to the supply conductor 142. The shunt field-magnet winding 18 is thus connected directly across the supply circuit. Upon operation of the main switch 24 and of accelerating switches 26 and 27, the circuit for the field-magnet winding 18 extends from the supply conductor 143 through the switch arm 141, winding 18, resistor 43, resistor 44, winding 144, and the switch arm 140 to the supply conductor 142. In case the accelerating switch 27 has not been operated, the resistor 44 is short circuited by the switch member 64 which bridges the contact members 66 and 67. Inasmuch as the resistors 43 and 44 are both included in the circuit of the shunt field-magnet winding, it is apparent the return stroke of the planer table is effected at a relatively rapid rate.

At the same time, as the above operations are effected, the contact segment 71 bridges the contact fingers 76 and 160 for completing a circuit to operate the feed switch 29. The energizing circuit for the feed switch 29 extends from the supply conductor 143 through the switch arm 141, series field-magnet winding 22, magnet 107, contact fingers 84 and 85, which are bridged by the contact segments 80 and 81, contact fingers 76 and 106, which are bridged by the contact segment 71, contact fingers 133 and 134, which are bridged by the contact segment 130, contact fingers 122 and 123, which are bridged by the contact segment 119, winding 144, and the switch arm 140 to the supply conductor 142.

The feed switch 29 is operated for completing a circuit through the feed motor 9. The circuit through the feed motor 9 extends from the supply conductor 143 through switch arm 141, winding 22, contact members 105 and 103, switch arm 100, armature 21, switch arm 98, contact members 101 and 104, resistor 112, winding 144, and the switch arm 140 to the supply conductor 142. The magnet 113 of the accelerating switch 30, which is connected across the armature 21 of the feed motor 9, is energized to operate the switch and short circuit the resistor 112. The feed motor continues operating until the contact segments 80 and 81 of the limit switch 31 are separated from the contact fingers 84 and 85. Thereupon, the feed switch 29 is released and a dynamic braking circuit is completed through the feed motor. The dynamic braking circuit extends from one terminal of the armature 21 through the contact arm 88, contact members 90 and 91, resistor 115, contact members 106 and 102, and switch arm 98 to the other terminal of the armature 21. The holding coils 97 and 108 for the feed switches 28 and 29 are connected across the dynamic braking circuit, and, accordingly, it is impossible to operate either of the feed switches until the dynamic braking current ceases to flow.

Near the end of the return stroke, the dog 12 engages the lever 14 for reversing the position of the pilot switch. The contact segment 70 is moved to bridge the contact fingers 74 and 75, the contact segment 71 is moved to bridge the contact fingers 77 and 160, and the contact segment 69 is moved to bridge the contact fingers 72 and 73. When the contact segment 69 is separated from the contact fingers 78 and 79, the main switch 24 is released and a dynamic braking circuit is completed through the main motor 5. The dynamic braking circuit through the main motor extends from one terminal of the armature 16, through the switch arm 46, contact members 48 and 49, holding coil 52, holding coil 40, contact members 37 and 36, switch arm 34, resistor 151, and the commutator winding 19 to the other terminal of the armature 16. The holding coils 40 and 59 not only prevent operation of the main switches 24 and 25 when a dynamic braking current is flowing but also prevent the simultaneous operation of the two switches.

The energizing circuit through the magnet 51 of the main switch 25 is closed by the contact segment 70 bridging the contact members 74 and 75. The energizing circuit for the magnet 51 extends from the supply conductor 143 through the switch arm 141, series field-magnet winding 17, holding coil 40, contact members 37 and 36, switch arm 34, magnet 51, contact fingers 74 and 75, which are bridged by the contact segment 70, contact fingers 134 and 133, which are bridged by the contact segment 130, contact fingers 122 and 123, which are bridged by the contact segments 119, winding 144, and the switch arm 140 to the supply conductor 142.

The main switch 25 is operated and a circuit is completed through the main motor 5, which extends from the supply conductor 142 through the switch arm 141, series field-magnet winding 17, holding coil 40, contact fingers 37 and 36, switch arm 34, resistor 151, commutator winding 19, armature 16, switch arm 46, contact members 47 and 50, winding 144 and switch arm 140 to the supply conductor 142. The main motor 5 is operated in a direction to effect a cutting stroke by the planer table 4. The accelerating switches 26 and 27 are operated for short circuiting the resistor 151. The energizing circuit for such accelerating switches extends from one terminal of the armature 16 through switch arm 46, contact members 53 and 54, magnets 61 and 128 of the accelerating switches 26 and 27 in parallel, contact members 120 and 121, which are bridged by the contact segment 118, contact members 131 and 132, which are bridged by the contact segment 129, contact fingers 72 and 73, which are bridged by the contact segment 69, and the commutator winding 19 to the other terminal of the armature 16.

Upon operation of the accelerating switches 26 and 27, the circuit through the shunt field magnet winding 18 extends from the supply conductor 143 through switch arm 141, winding 18, resistor 43, switch 41, winding 144 and the switch arm 140 to the supply conductor 142. During the cutting stroke of the planer, the resistor 44 is not included in the circuit of the shunt field-magnet winding, and, consequently the speed of the main motor is reduced.

The magnet of the feed switch 28 is energized by a circuit which extends from the supply conductor 143 through the switch arm 141, series field-magnet winding 22, magnet 96, contact fingers 86 and 87, which are bridged by the contact segments 82 and 83, contact fingers 77 and 160, which are bridged by the contact segment 71, contact fingers 133 and 134, which are bridged by the contact segment 130, contact fingers 122 and 123, which are bridged by the contact segment 119, winding 144, and the switch arm 140 to the supply conductor 142.

The switch 28 is operated and a circuit is completed through the feed motor 9, which extends from the supply conductor 143 through the switch arm 141, series field-magnet winding 22, contact members 95 and 93, switch arm 94, armature 21, switch arm 88, contact members 92 and 89, resistor 112, winding 144 and the switch arm 140 to the supply conductor 142. The feed motor 9 is operated in a reverse direction. The accelerating switch 30 is operated for short circuiting the resistor 112.

The feeding operation of the motor 9 is stopped by the limit switch 31 when the contact segments 82 and 83 are separated from the contact fingers 86 and 87. The feed switch 28 is released and the dynamic braking circuit above traced through the feed motor 9 is again completed.

The above cycle of operations of the feed and the main motor is repeated. In the above operations, it will be noted the accelerating coil for the accelerating switches associated with the main motor and the energizing coils for the two feed switches and for the two main switches are interlocked through both of the switch members 116 and 117 of the pendent switch mechanism 32. The switch member 116 of the pendent switch mechanism 32 controls the operation of the main motor 5 at will and the switch member 117 of the pendent switch controls the feed motor 9 at will. In order to effect operation of the main motor 5 by the pendent switch mechanism, the switch member 116 is moved upwardly, as shown in Fig. 2 of the drawing, to disengage the contact segment 118 from the contact fingers 120 and 121 and to disengage the contact segment 119 from the contact fingers 122 and 123. The separating of the contact segment 118 from the contact fingers 120 and 121 prevents any operation of the accelerating switches 26 and 27. The separating of the contact segment 119 from the contact fingers 122 and 123 prevents any operation of the main switches 24 and 25 and the feed switches 28 and 29 by the pilot switch 10. The switch member 116 is then given a movement of rotation in one direction or the other to bridge the contact segments 124 and 126 by the contact segment 119 or to bridge the contact members 125 and 127 by the contact segment 119. The bridging of the contact members 124 and 126 by the contact segment 119 operates the main switch 24 for effecting a return movement of the planer table. The energizing circuit for the main switch extends from the supply conductor 143 through the switch arm 141, series field-magnet winding 17, holding coil 52, contact members 49 and 48, switch arm 46, magnet 39, contact fingers 124 and 126, which are bridged by the contact segment 119, winding 144, and the switch arm 140 to the supply conductor 142.

When the contact segment 119 bridges the contact members 125 and 127, a circuit is completed which extends from the supply conductor 143, through the switch arm 141, series field-magnet winding 117, holding coil 40, contact members 37 and 36, switch arm 34, magnet 51, contact members 125 and 127, which are bridged by the contact segment 119, winding 144 and the switch arm 140 to the supply conductor 142. The main switch 27 is closed and the motor 5 is operated in a direction to effect a cutting stroke by the planer table.

The switch member 117, which controls the feed motor 9, is moved upwardly, as shown in Fig. 2 of the drawing, to prevent operation of the accelerating switches 26 and 27, and to prevent operation of the switches 24, 25, 28 and 29 by the pilot switch 10. In order to effect operation of the feed motor 9 in one direction by the feed switch 28, the switch member 117 is turned to bridge the contact fingers 135 and 137 by the contact segment 130. The energizing circuit for the feed switch 28 extends from the supply conductor 143 through the switch arm 141, winding 22, magnet 96, contact fingers 135 and 137, which are bridged by the contact segment 130, winding 144, and the switch arm 140 to the supply conductor 142.

In order to effect operation of the feed motor in a reverse direction, the switch member 117 is moved to bridge the contact members 136 and 138 by the contact segment 130. A circuit is completed for operating the feed switch 29. The energizing circuit for the feed switch 29 extends from the supply conductor 143 through the switch arm 141, the winding 22, magnet 107, contact members 136 and 138, which are bridged by the contact segment 130, winding 144, and the switch arm 140 to the supply conductor 142. The circuits completed through the feed motor were traced in describing the automatic operation thereof by the pilot switch 10.

Modifications in the system and in the arrangement and location of parts may be made within the spirit and scope of our invention and such modifications are intended to be covered by the appended claims.

What we claim is:

1. In a control system for a machine tool, the combination with a reciprocating member, a main motor for operating said reciprocating member, a cutting tool, and a feed motor for operating the cutting tool with respect to the reciprocating member, of means comprising a portable switch mechanism having one switch member for controlling the operation of the main motor at will and having a second switch member for controlling the operation of the feed motor at will.

2. In a control system for a machine tool, the combination with a reciprocating member, a main motor for operating said reciprocating member, two main switches for operating the main motor in a forward and in a reverse direction and for completing a dynamic braking circuit therethrough, a feed motor, and two feed switches for controlling the operation of the feed motor, of means comprising a portable switch mechanism having two switch members for respectively controlling the operation of the main and feed switches at will.

3. In a control system for a machine tool, the combination with a reciprocating member, a main motor for operating said reciprocating member, a cutting tool, and a feed motor for operating the cutting tool with respect to the reciprocating member, of means comprising a portable switch mechanism having two switch members for respectively controlling the operation of the main and feed motors at will, and means for automatically operating the main and the feed motor in accordance with the movement of the reciprocating member.

4. In a control system for a machine tool, the combination with a reciprocating member, a main motor for operating said reciprocating member, two main switches for operating the main motor in a forward and in a reverse direction and for completing a dynamic braking circuit therethrough, a feed motor, and two feed switches for controlling the operation of the feed motor, of means comprising a portable switch mechanism having two switch members for respectively controlling the operation of the main and the feed switches at will, and means for automatically operating the main and the feed switches in accordance with the movement of the reciprocating member.

5. In a control system for a machine tool, the combination with a reciprocating member, a main motor for operating the reciprocating member, and a feed motor, of means for automatically operating the main and feed motors, and means comprising a single portable switch mechanism having two switch members for respectively operating the main and the feed motors at will.

6. In a control system for a machine tool, the combination with a reciprocating member, a main motor for operating the reciprocating member, and a feed motor, of means controlled by the reciprocating member for automatically operating the main and the feed motor, means comprising a portable switch mechanism having two switch members for respectively operating the main and the feed motor at will, and means for preventing the automatic operation of the main and the feed motor when one of said switch members is operated.

7. In a control system for a machine tool, the combination with a reciprocating member, a main motor for operating said reciprocating member, and a feed motor for operating the cutting tool with respect to the reciprocating member, of means for automatically operating the main and the feed motor in accordance with the operation of the reciprocating member, and means comprising a portable switch mechanism having two switch members for respectively operating the main and the feed motor at will, said portable switch having means for preventing the automatic operation of the main and the feed motor when one of said switch members is operated.

8. In a control system for a machine tool, the combination with a reciprocating member, a main motor for operating the reciprocating member, two main switches for operating the main motor in a forward and in a reverse direction and for completing a dynamic braking circuit therethrough, a feed motor, and two feed switches for controlling the operation of the feed motor, of means for automatically operating the main and the feed switches in accordance with the movement of the reciprocating member, and means comprising a portable switch mechanism having two switch members for respectively operating the main and the feed motor at will, said portable switch mechanism having means for preventing the automatic operation of the main and the feed motor when one of said switch members is operated.

9. In a control system for a machine tool, the combination with a reciprocating member, a main motor for operating the reciprocating member, a feed motor, and two feed switches for operating the feed motor, of means for automatically controlling the two feed switches by the reciprocating member to effect operation of the feed motor in opposite directions at opposite ends of the movement of the reciprocating member, and a portable switch for operating the feed switches at will while preventing operation of the feed switches by the means automatically controlled by the reciprocating member.

10. In a control system for a machine tool, the combination with a reciprocating member, a main motor for operating the reciprocating member, a feed motor, two feed switches for operating the feed motor, and an accelerating switch for governing the acceleration of the feed motor, of means for automatically controlling the two feed switches by the reciprocating member to effect operation of the feed motor in opposite directions at opposite ends of the movement of the reciprocating member, and a portable switch for preventing operation of the two feeding switches and the accelerating switch by said automatic means under certain conditions and for operating the feed switches at will.

11. In a control system for a machine tool, the combination with a reciprocating member, a main motor for operating the reciprocating member, a feed motor, and two feed switches for operating the feed motor in a forward and in a reverse direction and for completing a dynamic braking circuit therethrough, of means for automatically controlling the two feed switches in accordance with the operation of the reciprocating member, and a portable switch for preventing operation of the two feed switches by said automatic means and for operating the feed switches at will.

12. In a control system for a machine tool, the combination with a reciprocating member, a main motor for operating the reciprocating member, a feed motor, and two feed switches for operating the feed motor in a forward and in a reverse direction and for completing a dynamic braking circuit therethrough, each of said feed switches having a holding coil for preventing the operation of the switch when a dynamic braking current is flowing through the feed motor, of means for automatically controlling the two feed switches in accordance with the operation of the reciprocating member, and a portable switch for preventing operation of the two feed switches by said automatic means and for operating the feed switches at will.

13. In a control system for a machine tool, the combination with a reciprocating member, a main motor for operating the reciprocating member, two main switches for operating the main motor in a forward and in a reverse direction and for completing a dynamic braking circuit therethrough, a feed motor, two feed switches for operating the feed motor in a forward and in a reverse direction and for completing a dynamic braking circuit therethrough, and a pilot switch operated by the reciprocating member for automatically controlling the main and the feed switches, of a portable switch mechanism having two switch members for respectively controlling the main and the feed motors at will, each of said switch members having an interlock for preventing the automatic operation of the main and the feed switches under certain conditions.

14. In a control system for a machine tool, the combination with a reciprocating member, a main motor for operating the reciprocating member, two main switches for operating the main motor in a forward and in a reverse direction and for completing a dynamic braking circuit therethrough, an accelerating switch for said main motor, a feed motor, two feed switches for operating the feed motor in a forward and in a reverse direction and for completing a dynamic braking circuit therethrough, an accelerating switch for said feed motor, and means for automatically operating the main and the feed switches in accordance with the operation of the reciprocating member, of a portable switch mechanism having two switch members for respectively controlling the main and the feed motors at will, each of said switch members having interlocks for preventing the automatic operation of the main and the feed switches in accordance with the operation of the reciprocating member and for preventing operation of the accelerating switches.

In testimony whereof, we hereto affix our signatures.

ROBERT C. DEALE.
HAROLD L. BLOOD.